United States Patent [19]

Funaki et al.

[11] Patent Number: 5,517,266
[45] Date of Patent: May 14, 1996

[54] CAMERA WITH INFORMATION RECORDING DEVICE

[75] Inventors: Akihiko Funaki; Yukitaka Takeshita; Naoyuki Nishino; Yutaka Yoshida, all of Saitama, Japan

[73] Assignee: Fuji Photo Film Co., LTD., Kanagawa, Japan

[21] Appl. No.: 141,947

[22] Filed: Oct. 28, 1993

[30] Foreign Application Priority Data

Oct. 28, 1992 [JP] Japan .................................. 4-290370

[51] Int. Cl.⁶ .................................................. G03B 17/24
[52] U.S. Cl. .................................................. 354/106
[58] Field of Search ........................ 354/105, 106, 354/173.1, 173.11, 217, 218, 213

[56] References Cited

U.S. PATENT DOCUMENTS

| | | | |
|---|---|---|---|
| 5,119,119 | 6/1992 | Amano et al. | 354/106 |
| 5,128,711 | 7/1992 | Terashita | 355/41 |
| 5,155,511 | 10/1992 | Tamamura | 354/76 |
| 5,205,506 | 4/1993 | Mizuno et al. | 242/71.1 |
| 5,247,321 | 9/1993 | Kazami | 354/106 |
| 5,272,498 | 12/1993 | Wakabayashi | 354/105 |
| 5,281,987 | 1/1994 | Nagata | 354/105 |
| 5,287,136 | 2/1994 | Kitagawa et al. | 354/173.1 |
| 5,307,100 | 4/1994 | Kubo | 354/105 |
| 5,404,196 | 4/1995 | Terashita | 354/105 |

FOREIGN PATENT DOCUMENTS

| | | |
|---|---|---|
| 0435277 | 7/1991 | European Pat. Off. . |
| 5767920 | 4/1982 | Japan . |
| 2084746 | 4/1982 | United Kingdom . |

Primary Examiner—Michael L. Gellner
Assistant Examiner—Nicholas J. Tuccillo
Attorney, Agent, or Firm—Sughrue, Mion, Zinn, Macpeak & Seas

[57] ABSTRACT

A camera having a magnetic head and a light emitting element for recording information such as photographing date on a photographic film. A film guide plate is fixed to the camera body on the back side of the exposure frame, and spaced by a predetermined distance from the exposure frame. A circuit board is fixedly mounted on the back side of the film guide plate. The magnetic head is mounted on the film guide plate and electrically connected to the circuit board. A plurality of projections are formed on the back surface of the film guide plate integrally therewith. Each projection has a slit formed therein. The light emitting element and a perforation sensor are mounted on the circuit board and face to the photographic film via the slits. The circuit board has circuits for driving the light emitting element and magnetic head, a liquid crystal panel, a controller, and other circuit elements.

7 Claims, 6 Drawing Sheets

CAMERA WITH INFORMATION RECORDING DEVICE

BACKGROUND OF THE INVENTION

1. Field of the Invention

The present invention relates to a camera capable of magnetically and photographically recording information of each picture frame on a photographic film.

2. Description of the Related Art

There are known various types of cameras having a built-in information recording device for magnetically or photographically recording information such as a photographing date, a photographing format, and exposure data on a photographic film at the time of photographing. In the case of magnetic recording, a magnetic head is used, and in the case of photographic recording, a record/display unit is used. The record/display unit is formed by a liquid crystal device (LCD) or light emitting diodes (LED), both in the order of 60 segments. For example, in order to record a photographing date on a photographic film, not only a clock circuit but also a monitor display unit made of an LCD or LEDs is required to check whether the time of the clock circuit is correct. Other circuits are also required, such as a circuit for converting information into a signal suitable for the recording type, a timing circuit used for writing information synchronously with a film advance, and a controller for the sequence control of each circuit. An information recording device has a huge number of lead wires interconnecting such circuits. It is therefore desirable to mount these circuits on one circuit board, when considering the simplicity of manufacturing and the effectiveness in space.

In the case of recording information regarding a picture frame at the area near the frame, if the record area is not set at a high precision, an error may occur when reading the information by a photographic print system. Therefore, an approach has been used wherein a magnetic head or LED is driven while monitoring the film advance amount based on the detection of perforations. In this case, not only a photo sensor for detecting a perforation is required, but also the relative position between the photo sensor and the magnetic head or LED is required to be set precisely.

In the case of magnetic recording in synchronism with a film advance, it is necessary to stabilize the contact condition (head touch) between the magnetic recording layer of a film and the magnetic head, because magnetization of the layer otherwise would become insufficient, resulting in a possible read error. In order to maintain the head touch constant, it is advantageous to set correctly the position of the magnetic head relative to the film pressure plate which mainly regulates the position of the film.

Assuming that the above information recording is to be performed, the system structure of a camera becomes complicated should the film advance control and the information recording control be performed by separate control circuits. In addition, it is necessary to use long lead wires on which electrical noises are likely to be superposed.

It is desired to make compact the record/display unit and the information recording device. It is also necessary to precisely set the position of an information recording element relative to a perforation sensor and a film pressure plate and to set the record areas on a photographic film at regular positions. With conventional information recording devices, these factors have been considered insufficiently, leading to a wasteful assembly space, irregular information record areas, and data read errors.

SUMMARY OF THE INVENTION

It is a principal object of the present invention to provide a camera wherein several circuit units of an information recording device are spatially effectively configured to make the camera compact.

It is another object of the present invention to provide a camera capable of setting the record areas of information on a film at regular positions.

In order to achieve the above and other objects of the present invention, a circuit board is fixed to a film guide plate (inclusive of a film pressure plate) on the back side of the plate. Circuit units necessary for information recording are mounted on the circuit board. A magnetic head is fixed to the film guide plate and electrically connected to the circuit board. The front of the magnetic head is made generally flush with the front surface of the film guide plate which contacts a photographic film. A light emitting element for photographically recording information on a photographic film is fixed on the front surface of the circuit board. A slit is formed in the film guide plate facing the light emitting element. Light radiated from the light emitting element passes through the slit and is applied to the back surface of the film to record information in the form of bar code. Similarly, a reflection type sensor for detecting a perforation is mounted on the circuit board. The sensor faces the photographic film via a slit in the film guide plate.

According to a preferred embodiment of the present invention, the film guide plate is mounted on the camera body and spaced apart by a predetermined distance from an exposure frame. A projection is formed on the back surface of the film guide plate, the projection extending toward the light emitting element and is formed with a slit. A monitor display unit is mounted on the back side of the circuit board, and information displayed on this unit is observed via a window of the back cover fixed to the camera body.

According to the present invention, circuit units necessary for information recording are spatially effectively configured and assembled on the single circuit board disposed on the back side of the film guide plate. Accordingly, the spatial effectiveness in assembly can be improved and the camera can be made compact and thin. The length of each lead wire becomes short, reducing superposed electrical noises.

BRIEF DESCRIPTION OF THE DRAWINGS

The above and other objects and advantages of the present invention will become apparent from the detailed description of the preferred embodiments when read in conjunction with the accompanying drawings, in which.

DETAILED DESCRIPTION OF THE PREFERRED EMBODIMENTS

Figures 1A, 1B:
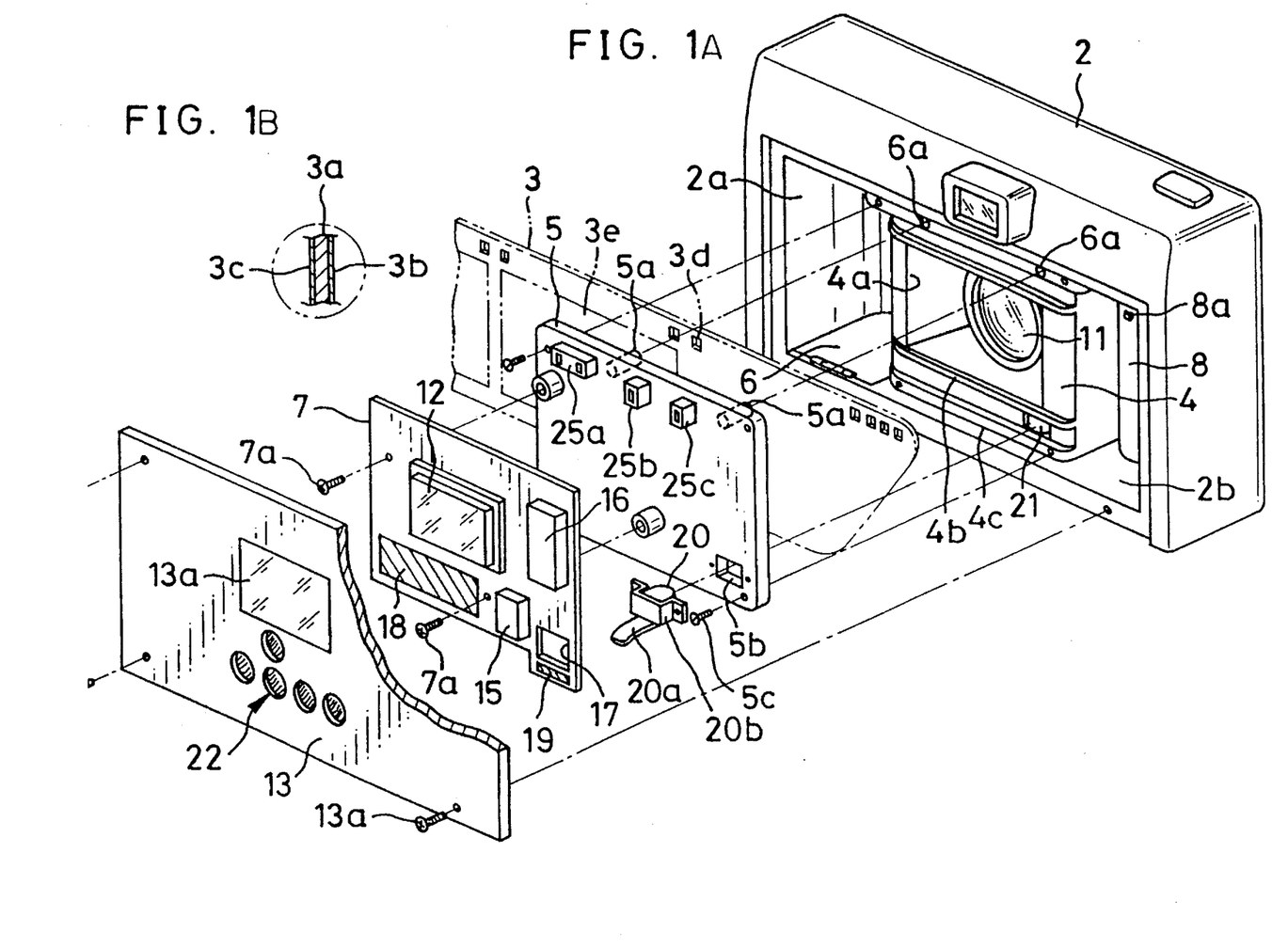
FIG. 1 is a broken perspective view of a camera according to an embodiment of the invention, as seen from the back side of the camera.
Figure 2:
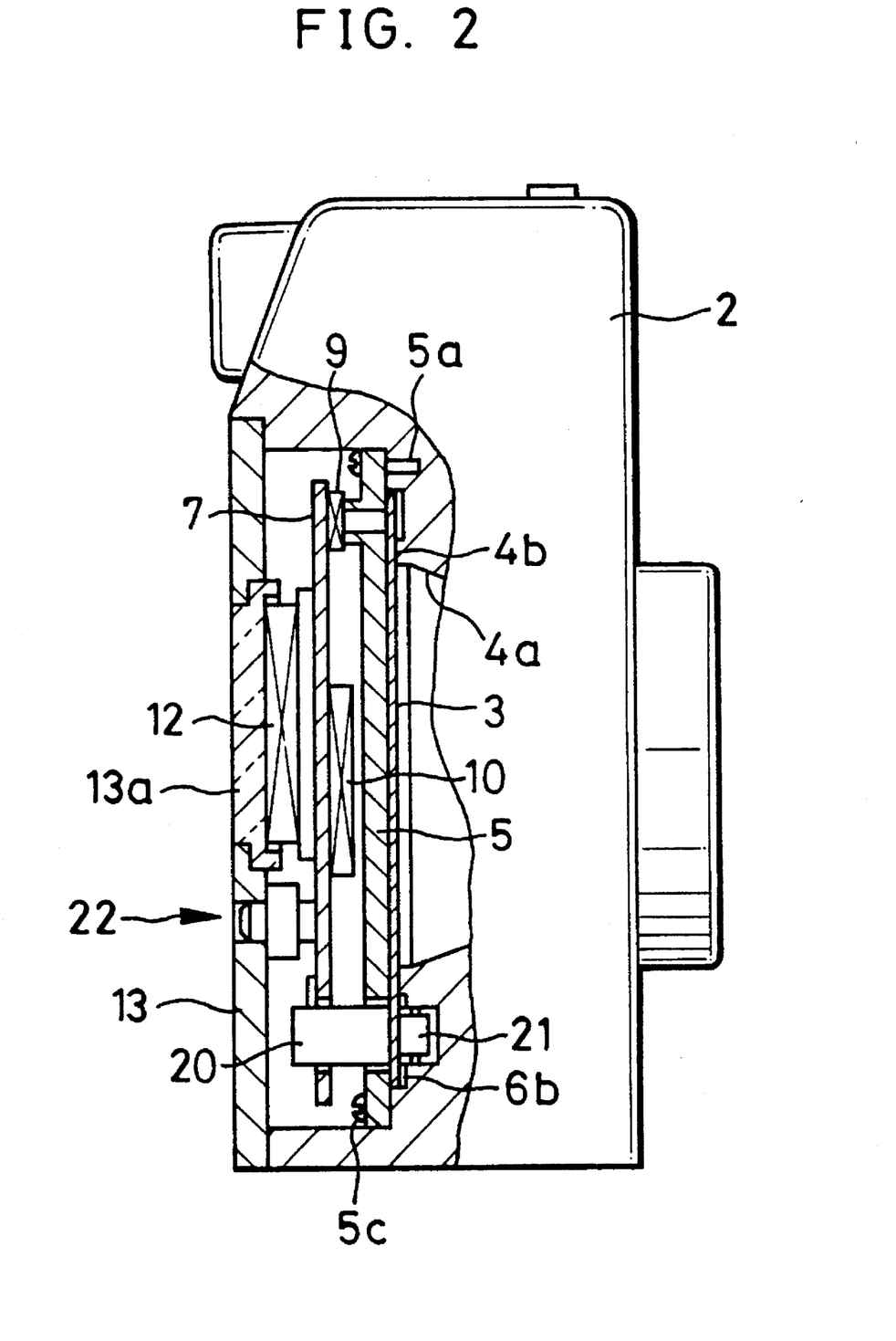
FIG. 2 is a schematic diagram partially in section showing the main part of the camera shown in FIG. 1.

Referring to FIGS. 1 and 2, a camera body 2 has a cassette chamber 2a and a film take-up chamber 2b. Between the chambers 2a and 2b, there is disposed an exposure frame 4 having an exposure aperture 4a formed therein. Film rails 4b are formed on the upper and lower sides of the exposure aperture 4a. A film door 6 is hinged to the bottom of the cassette chamber 2a, the door 6 being opened and closed to load or unload a photographic film cassette (not shown) in or from the cassette chamber 2a in the axial direction. As described, for example, in U.S. Pat. No. 5,205,506, the film leader is being fully accommodated in a photographic film cassette at the initial stage, and as the spool rotates, the leader portion of a photographic film 3 is advanced through the film passage mouth.

A film guide plate 5 ensures the flatness of the photographic film 3 and is mounted on the back of the camera body 2 by means of two screws 5c. Between the film guide plate 5 and exposure frame 4, a tunnel or film passage 6b is formed interconnecting the cassette chamber 2a and film take-up chamber 2b.

The film guide plate 5 abuts at its front side on a pair of steps 4c formed on the upper and lower sides of the exposure frame 4, and a pair of pins 5a projecting forward from the film guide plate 5 are inserted in a pair of positioning holes 6a formed in the exposure frame 4. The height of the steps 4c is greater than that of the film rails 4b so that the space between the film rails 4b and the film guide plate 5 is set slightly larger than the thickness of the film 3. The work precision of the steps 4c is made so high that the position of the film guide plate 5 in the direction of the optical axis of a taking lens 11 can be set precisely. Moreover, use of the pins 5a provides the highly precise positions of the film guide plate 5 relative to the exposure frame 4 both in the vertical direction and horizontal direction. The width and space of the tunnel 6b are also set precisely, and because the positioning of the film guide plate 5 is determined as described above, the space between the film guide plate 5 and the exposure frame 4 can be maintained precisely at a predetermined value. Accordingly, the contact condition between the front surface of the film guide plate 5 and the back surface of the film 3 can be maintained always constant.

The film 3 has a base 3a, an emulsion layer 3b formed on the base 3a, and a transparent magnetic recording layer 3c formed on the back surface of the film. On one side of the film 3, there are formed perforations 3d for determining the position of each picture frame 3e formed by photographing. In this embodiment, two juxtaposed perforations 3d are formed at an equal distance pitch, along lines extending from shorter sides of picture frames 3e. On the film leader portion, perforations, for example, four perforations, are formed at an equal pitch. These perforations are captured by claws 8a of a take-up shaft 8 rotating in the film take-up chamber 2b when the film leader is advanced to the film take-up chamber 2b by the rotation of the spool of the film cassette.

A circuit board 7 is fixed on the back of the film guide plate 5 by means of screws 7a. On the front surface of the circuit board 7, perforation sensors 9 and a controller 10 including a CPU chip are mounted (see FIGS. 2 and 3). On the back surface of the circuit board 7, an LCD unit 12 for displaying data to be printed and information necessary for photographing operations, and other circuits are mounted. The LCD unit 12 includes an LCD panel and an LCD driver for selectively driving liquid crystal segments of the LCD panel.

A back cover 13 is fixed on the back of the camera body 2 by means of screws 13a for the light shielding of the cassette chamber 2a and film take-up chamber 2b. The back cover 13 is formed with a window 13a made of a transparent plate through which information displayed on the LCD unit 12 can be observed from the outside of the camera.

Assembled on the back of the circuit board 7 are an IC magnetic head driver 15 and a motor drive IC 16, as well as the above-described LCD unit 12. Also formed in and on the circuit board 7 are an opening 17, a switch contact 18, and a magnetic head terminal unit 19.

The magnetic head driver 15 drives a magnetic head 20 mounted on the film guide plate 5 to record data on the transparent magnetic recording layer 3c applied as coat on the whole back surface of the film 3. For the data record control, a flexible printed wiring sheet 20a connected to the magnetic head 20 is connected to the magnetic head terminal unit 19 via the opening 17. The motor drive IC 16 controls the operation of a film transport motor M (refer to FIG. 5), and also detects a film advance speed from the rotation speed of the motor M. The switch contact unit 18 detects a depression of an operable switch input unit 22 mounted on the back cover 13.

The LCD unit 12 and other components mounted on the back surface of the circuit board 7 are electrically connected to the controller 10 on the front surface via known through holes formed in the circuit board 7. Under the control of the controller 10, the LCD unit 12, magnetic head driver 15, motor drive IC 16, and switch input unit 12 are operated. Other various circuit components are mounted on the circuit board 7, and necessary lead wire patterns are printed on the circuit board 7. These components and patterns are omitted in FIG. 1 for the simplicity purpose of the drawing.

The magnet head 20 is held in position by a bracket 20b which is fixed on the back surface of the film guide plate 5 by means of screws. The front of the magnetic head 20 enters an opening 5b formed in the film guide plate 5 to make the recording surface (surface having the head gap) thereof flush with the front surface of the film guide plate 5. Since the position of the guide plate 5 relative to the camera body 2 is definite, the head touch can be maintained in a good condition by fixing the magnetic head 20 to the film guide plate 5 in the manner described above. A free roller 21 is mounted at the position facing the magnetic head 20 so as to reduce the film advance load exerted by the magnetic head 20 and obtain a good contact pressure. The free roller 21 is biased by a spring plate (not shown) toward the film guide plate 5 and rotates following the transport of the film 3.

Figure 3:
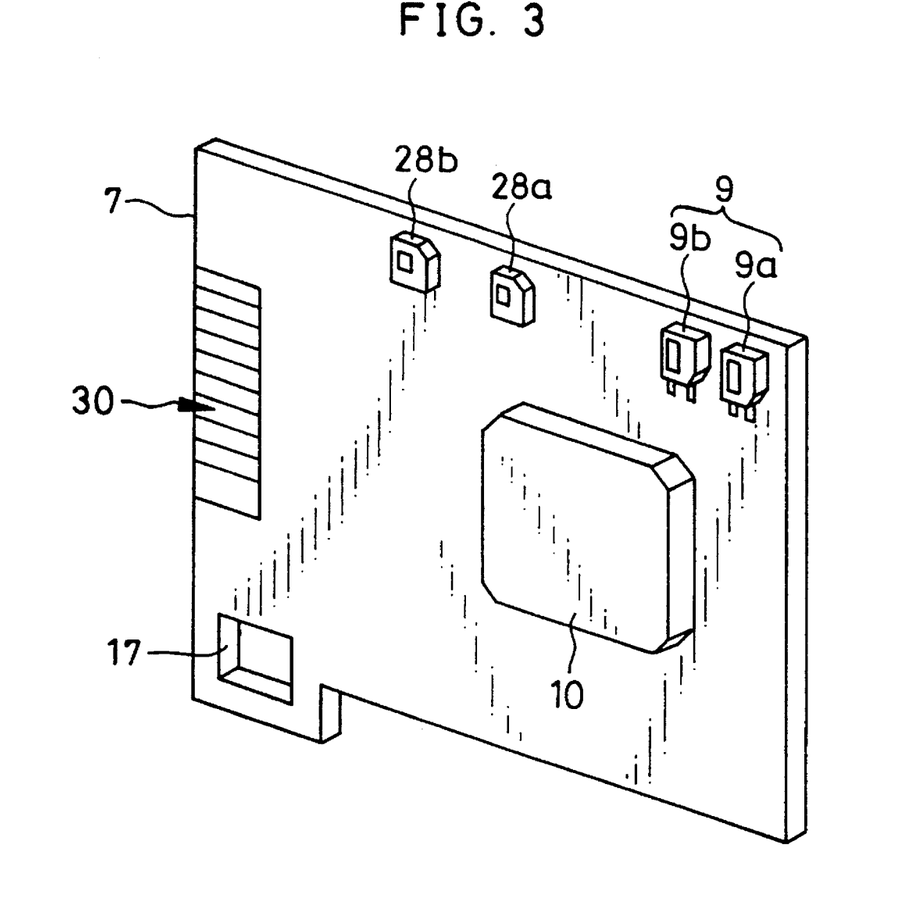
FIG. 3 is a perspective view of the circuit board as seen from the front side.

Projections 25a, 25b, and 25c are integrally formed on the back of the film guide plate 5. The projections 25a to 25c are generally tubular in configuration and have slits having longer vertical sides. As shown in FIG. 3, reflection type perforation sensors 9a and 9b are mounted on the front surface of the circuit board 7, at the positions corresponding to the slits in the projection 25a. Similarly, LED chips 28a and 28b are mounted at the positions corresponding to the slits in the projections 25b and 25c. The perforation sensors 9a and 9b photoelectrically detect the perforations 3d to monitor the advance of the film 3. The precision of detecting each perforation can be made high because the passage of the perforation is detected via the slits deepened within the projection 25a.

Figure 4:
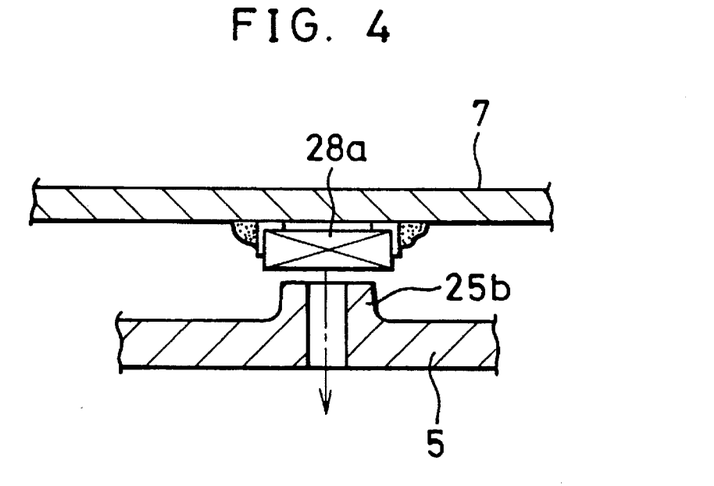
FIG. 4 is a partial cross section of the film guide plate and circuit board.

The LED chips 28a and 28b are flashed by the controller 10 during the film advance to photographically record bar codes on the film 3. The radiated light from the turned-on LED chip 28a, 28b reaches the film 3 after passing through the slits in the projections 25b and 25c so that light scattering can be suppressed and bars having sharp edges can be recorded. FIG. 4 illustrates the state of suppressing light scattering for the case of the LED chip 28a by way of example. Even if there is some gap between the LED chip 28a fixed on the circuit board 7 and the film guide plate 5, light radiated from the LED chip 28a can be guided effectively to the film 3 by using light reflection at the inner surface of the slit in the projection 25b. Instead of using pairs of perforations 9a and 9b and LED chips 28a and 28b, a combination of a single perforation and a single LED chip may be used.

Also on the front surface of the circuit board 7, various circuit components are mounted and lead wire patterns are formed, but they are omitted in the drawing. On the front surface of the circuit board 7, a terminal group 30 is formed which is connected to a main CPU via a flexible lead wiring sheet. The main CPU is assembled on a flexible printed circuit board housed within the camera body 2.

Figure 5:
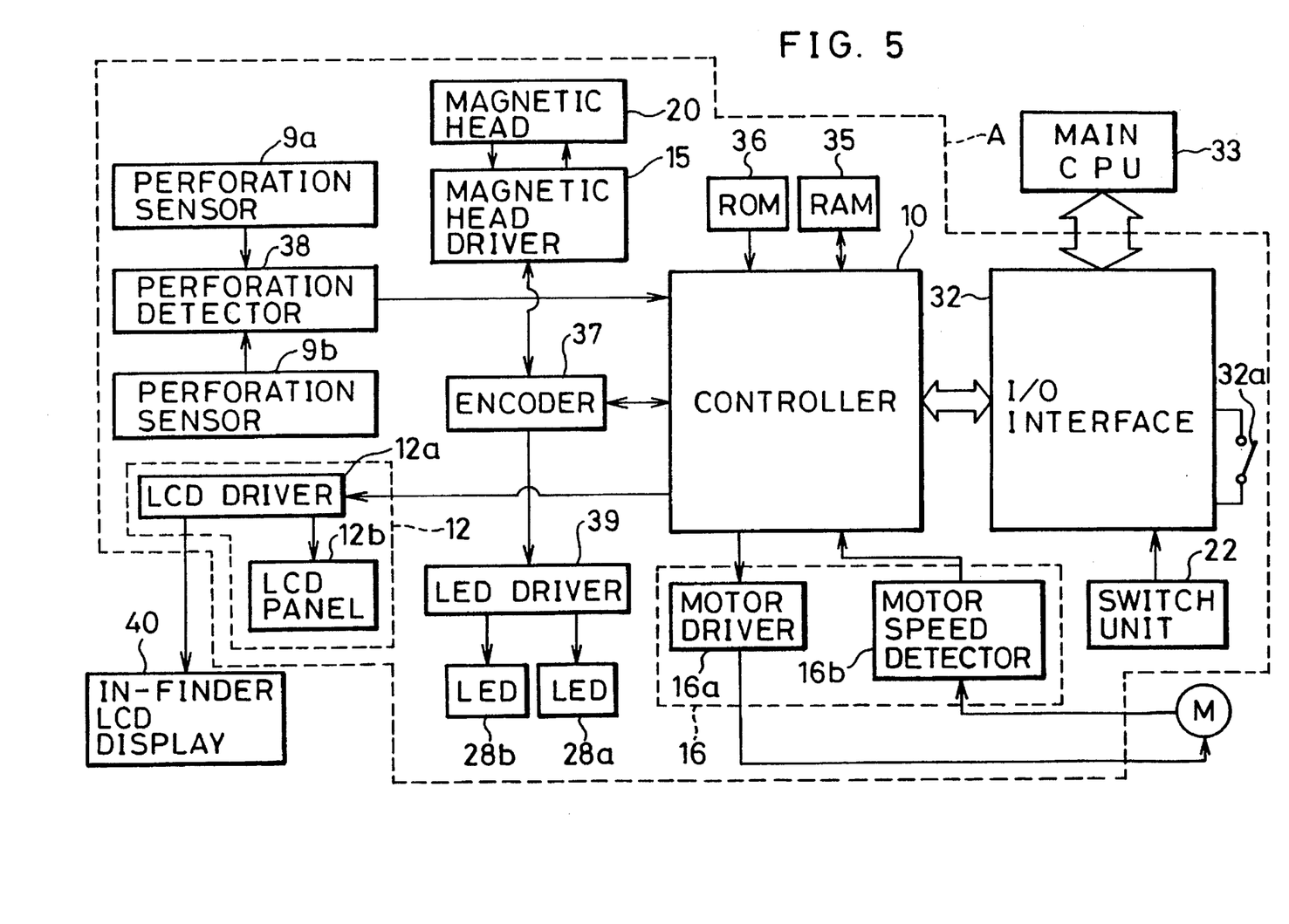
FIG. 5 is a block diagram showing the outline of the information recording device.

FIG. 5 shows the complete circuit arrangement of the camera in which the circuit portion A enclosed by a broken line is mounted on the circuit board 7. The controller 10 is connected via an I/O interface 32 to the main CPU 33 for the transfer of commands, control signals, and data therebetween. Signals supplied from the main CPU 33 to the controller 10 include, for example, a film signal (indicating film loading/unloading, or indicating whether the loaded film is usable), a close signal indicating that the film door 6 has been closed, a main switch on/off signal, a photographing format signal (indicating the size of a frame such as a full-size, panorama-size, and other sizes), an advance command signal (causing a film advance), and a battery capacity signal. Signals supplied from the controller 10 to the main CPU 33 include, for example, a release inhibition signal for inhibiting a shutter release during a film advance.

Signals from the operable switch input unit 22 mounted on the back cover 13 are also transferred to the I/O unit 32. The operable switch input unit 22 generates signals such as a select signal indicating whether to record information on the film 3, a time adjusting signal for a clock circuit included in the controller 10, and a rewind signal for forcibly rewinding the film prematurely during photographing of the film 3. A jumper switch 32a is selectively turned on or off depending upon whether the I/O interface 32 is used in a parallel mode or in a serial mode. In the parallel mode, each terminal of the terminal group 30 mounted on the circuit board 7 is assigned for a specific meaning, and each signal is transferred via a corresponding signal line. In the serial mode, each signal is serially transferred by using signal lines of a predetermined number of bits. Therefore, either the parallel mode or the serial mode can be selected in accordance with the type of the camera (the type of the main CPU mounted on the camera body side). Therefore, the circuit board 7, i.e., the circuit portion A, can be used in common irrespective of the camera type.

The circuit portion A includes the controller 10, LCD unit 12, magnetic head driver 15, motor drive IC 16, magnetic head 20, perforation sensors 9a and 9b, and other components, respectively already described, and in addition, a RAM 35, a ROM 36, an encoder 37, a perforation detector 38, and an LED driver 39. RAM 35 is used as a temporary storage for storing various data and flags, and ROM 36 stores sequence programs necessary for information recording and film advance control.

The encoder 37 encodes record information and read information in cooperation with the controller 10, magnetic head driver 15, and LED driver 39, generates error correction signals for the read information, generates clock pulses for the information record, and controls the recording of information. The perforation detector 38 receives photoelectrically converted signals from the perforation sensors 9a and 9b to detect the passage of film perforations 3d during a film advance. The detected signals are supplied to the controller 10 which in turn generates timing signals for the film advance and information recording.

Figure 6:
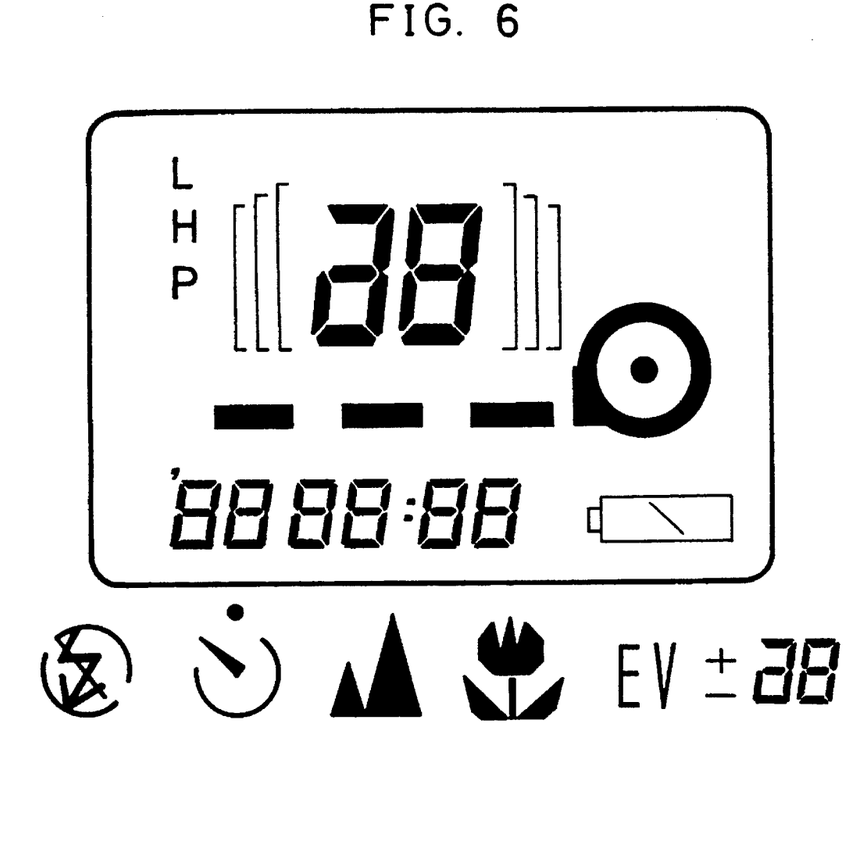
FIG. 6 illustrates examples of symbols displayed on a monitor LCD panel.

The LCD unit 12 has the LCD driver 12a and LCD panel 12b. The LCD panel 12b receives a drive signal from the LCD driver 12a to display a variety of marks representing the current state of the camera. FIG. 6 illustrates various symbols displayed on the LCD panel 12b. For example, displayed in the rectangular frame are the number of photographed frames (or the number of remaining frames), a film advance state, a battery capacity state, a date, and a frame size. Other symbols include a flash use, a self-timer selection, an infinite subject or near subject, and an exposure correction. The LCD driver 12 also controls the operation of an in-finder LCD 40 inside a viewfinder and displays a frame indicating a presently selected photographing format in accordance with a photographing mode signal.

The motor drive IC 16 has a transport motor driver 16a and a motor speed detector 16b. In response to a signal from the controller 10, the transport motor driver 16a controls the operation of the film transport motor M. The motor speed detector 16b detects a synchronizing signal corresponding to the rotation speed of the motor M. The synchronizing signal is supplied to the controller 10 which then generates a record timing signal corresponding to the synchronizing signal and sends it to the encoder 37. Therefore, the magnetic head 20 and LED chips 28a and 28b are driven in synchronization with the film advance speed so that each recording area becomes definite in the film advance direction, providing reliable information record.

The operation of the information recording device for a camera constructed as above will be described. The film door 6 is opened to load a photographic film cassette in the cassette chamber 2a. When the film door 6 is closed, the motor M automatically starts rotating. As the motor M rotates, the spool of the cassette rotates to advance the film leader out of the cassette and transport it via the film passage 6b to the film take-up chamber 2b. Since the film take-up shaft 8 rotates in the film take-up chamber 2b, the perforations of the film leader are captured when it reaches the film take-up shaft 8. Thereafter, the rotation of the spool in the cassette stops, and the film 3 is advanced by the rotation of the film take-up shaft 8.

When the perforation sensors 9a and 9b detect a pair of perforations 3d, the motor M stops its rotation. After framing and depressing the shutter button, the camera mechanism is activated in the well known manner. Therefore, the first picture frame 3e is formed as a latent image on the area of the film 3 at the back of the exposure aperture 4a. Immediately this photographing, the controller 10 receives a film advance command from the main CPU 33 and makes the motor drive IC 16 operate. The motor M therefore starts rotating for the one frame advance of the film 3. The rotation speed of the motor M is unstable at the start period, and this unstable condition is detected by the motor speed detector 16b. During this period, neither the magnetic head driver 15 nor the LED driver 39 is activated.

When the film advance progresses and the rotation speed of the motor M becomes stable and constant, the magnetic head driver 15 and LED driver 39 are activated to magnetically and photographically record the information corresponding to the settings of the switch input unit 22. A good head touch of the magnetic head 20 can always be maintained while the film 3 is transported in the tunnel 6b defined by the exposure frame 4 and film guide plate 5, because the film guide plate 5 is fixed to the exposure frame 4 and the magnetic head 20 is fixed to the film guide plate 5. Furthermore, the information can be recorded clearly without any light diffusion or bleeding because the light radiated from the LED chips 28a and 28b reaches the film after passing through the slits in the projections 25b and 25c. Of the record information, photographing date and format are read before the print process to print such additional information on a photographic paper, or to use it for the automatic setting of a print format.

While the film is advanced by a predetermined length, information record is completed by the magnetic head 20, and LED chips 28a and 28b. As the film is further advanced and when the next pair of perforations 3d are detected by the perforation sensors 9a and 9b, the controller 10 sends a stop signal to the motor drive IC 16. At this time, the motor M stops and the one frame advance is completed. While the motor drive IC 16 is operating after the reception of the film transport command from the controller 10, the release inhibition signal is being inputted to the CPU 33 to inhibit the shutter release. When the controller 10 sends the stop signal to the motor drive IC 16, the release inhibition signal is dissolved to wait for the next photographing.

Recording information to the film 3 is performed in the manner described above. In the information recording device of the present invention, most of the circuit components necessary for the information recording are assembled on the circuit board 7 mounted on the back of the film guide plate 5. Accordingly, the information recording device can be configured independently from the main CPU 33 of the camera so that the information recording device can be manufactured easily, even inclusive of information main record programs. For the information recording, particularly the information recording using the magnetic head 20, electrical noise superposition becomes a serious issue. However, since the magnetic head driver 15 is assembled on the same circuit board 7 electrically connected to the magnetic head 20, signal lines become short enough to be free from almost all electrical noises.

The transport passage of the film 3 on which the magnetic recording is performed, is regulated by the film guide plate 5 to which the magnetic head 20 is correctly positioned, providing always a stable head touch. For the magnetic recording with less read error, the advance speed of the recording medium or film 3 becomes an important factor. In this context, also the influence of superposed electrical noises can be effectively suppressed because the motor drive IC 16 for the advance control of the film 3 and the perforation sensors 9a and 9b for the detection of the film advance amount are assembled on the same circuit board 7 mounting the controller 10, and control signal lines become very short. Also, the assembly of the LED chips 28a and 28b for the optical or photographic recording on the circuit board 7 simplifies the circuit structure and effectively reduces the assembly space.

A display unit is essential for a camera with an information recording function so as to allow the confirmation of the contents of information to be recorded. In the above embodiment, the LCD unit 12 is used for this purpose and assembled on the back surface of the circuit board 7 on the remote side from the film guide plate 5. Accordingly, the information recording device can be made thin, and the assembly process can be performed with spatial effectiveness. In addition, since the switch contact unit 18 is mounted on the back surface of the circuit board 7, an input of information can be readily executed from the back cover 13 side.

Figure 7:
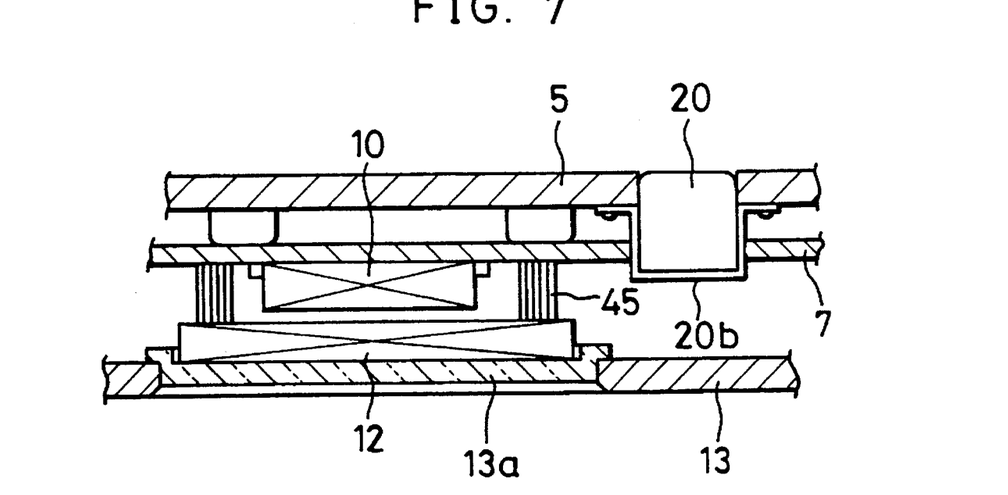
FIG. 7 is a cross section showing the main part of another embodiment of the invention wherein the controller is mounted under the monitor LCD panel.

In the above embodiment, the controller 10 is mounted on the front surface of the circuit board 7. The controller 10 may be mounted on the back surface of the circuit board 7 and in front of the LCD unit 12. In this case, rubber connectors 45 are mounted, and formed by an elastic insulating support with conductive wires being embedded may be used for the electrical connection between the LCD unit 12 and circuit board 7. Since the rubber connectors 45 are flexible, the LCD unit 12 supported by the rubber connectors 45 can be easily positioned in alignment with the transparent window 13a relative to the display surface of the LCD unit 12.

Figure 8:
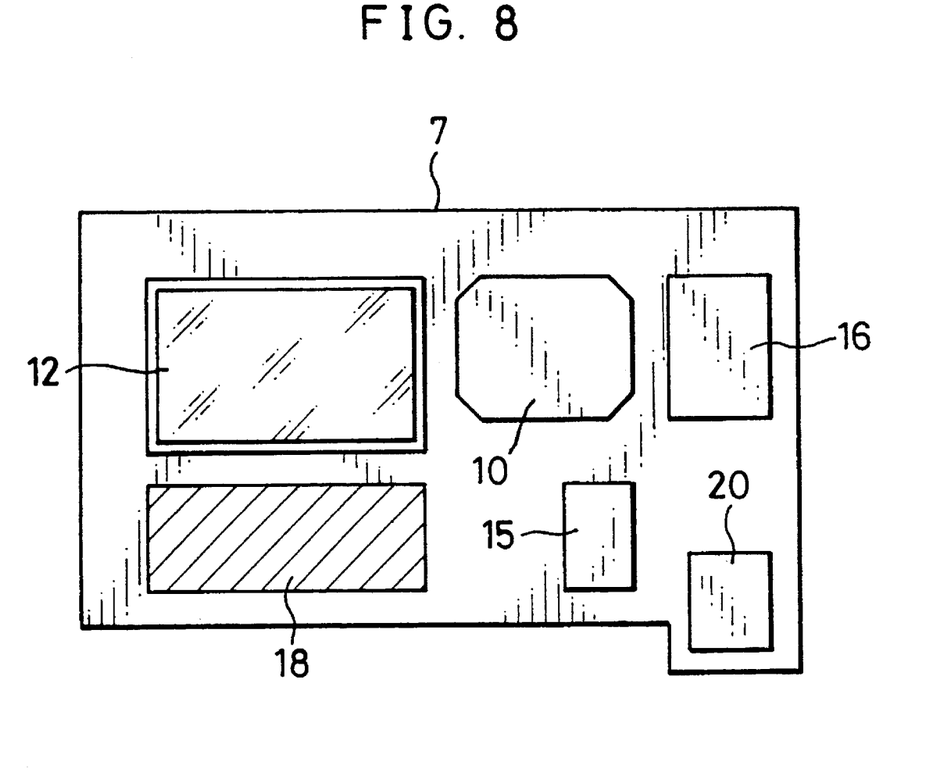
FIG. 8 is a schematic diagram showing another example of the layout of circuit components on the circuit board.
Figure 9:
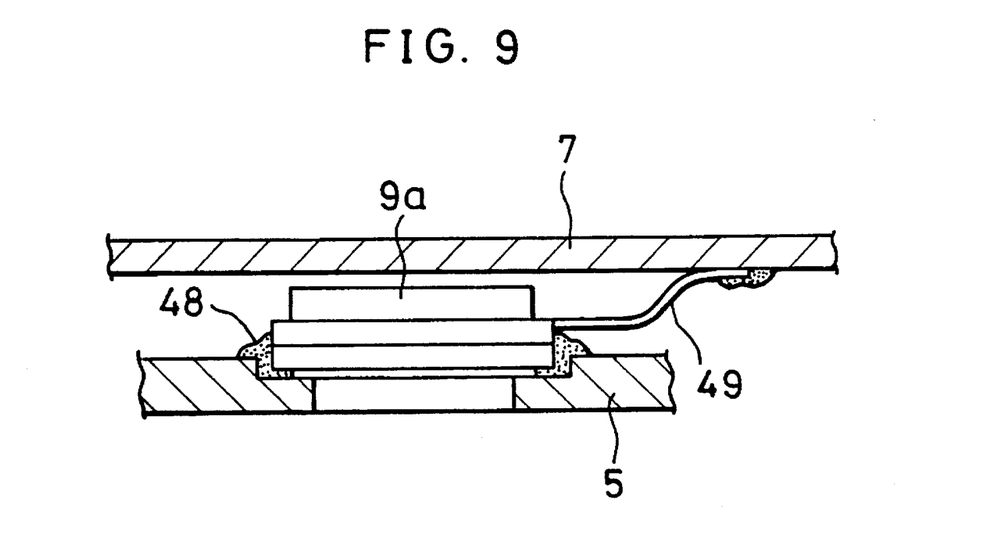
FIG. 9 is a partial cross section showing an example of the perforation sensor mounted on the film guide plate.

As schematically shown in FIG. 8, if the circuit board 7 has an enough space, all of the controller 10, LCD unit 12, magnetic head driver 15, motor drive IC 16, and switch contact unit 18 may be disposed on the back surface of the circuit board 7. In this case, the information recording device can be made thinner. As shown in FIG. 9, instead of assembling the perforation sensor 9a, 9b on the back surface of the circuit board 7, the perforation sensors 9a and 9b (in FIG. 9 only the sensor 9b is shown) may be fixed on the back surface of the film guide plate 5 by means of adhesive agent 48. In this case, lead wires 49 connected to the perforation sensors 9a and 9b are soldered to corresponding wiring pattern areas on the circuit board 7. Similarly, the LED chips 28a and 28b may also be bonded to the back surface of the film guide plate 5. With this arrangement, the cylindrical projections are not needed to be mounted on the film guide plate 5 and the space between the circuit board 7 and film guide plate 5 can be made smaller, further reducing the thickness of the information recording device.

In the present invention, only one of the magnetic recording and optical recording can be applied. In the case where only the magnetic recording is applied, light emitting diodes and slits can be omitted. When only with the optical recording, magnetic head can be omitted. In the above embodiment, a photographic film cassette has been used which is of the type that the entire roll of the film is wound within the cassette and the film leader is advanced by the rotation of the spool. A conventional photographic film cassette of the type that the film leader is pulled out of the cassette at the initial condition, may also be used. In this case, a back cover is pivotally mounted on the back of the camera body, a film pressure plate is mounted on the back cover via a spring plate, and the circuit board is fixed to the film pressure plate.

Although the present invention has been described with reference to the preferred embodiment shown in the drawings, the invention should not be limited by the embodiments but, on the contrary, various modifications, changes, combinations and the like of the present invention can be effected without departing from the spirit and scope of the appended claims.

We claim:

1. A camera having a light emitting element and a photosensor in the camera body in which information is photographically recorded on the back surface of a photographic film, said camera comprising:

an exposure frame defining an exposure aperture for determining an exposure area on said photographic film;

a film guide plate for supporting the back surface of said photographic film, said film guide plate being disposed at the back of said exposure frame and spaced by a predetermined distance from said exposure frame;

a circuit board mounted on the back side of said film guide plate, said light emitting element and said photosensor being mounted on the front side of said circuit board; and first and second projections extending from the back surface of said film guide plate toward said light emitting element and said photo sensor respectively, first and second slits being formed in said first and second projections, respectively, said photosensor facing said second slit and said light emitting element facing said first slit.

2. A camera according to claim 1, wherein said film guide plate is fixed to said exposure frame.

3. A camera according to claim 2, further comprising a back cover fixed to said camera body opposing the back side of said circuit board to shield the film from light.

4. A camera according to claim 3, further comprising a liquid crystal panel mounted on the back side of said circuit board, and a window formed in said back cover for allowing observation of said liquid crystal panel externally from said camera body.

5. A camera according to claim 4, wherein a magnetic head driver for driving said magnetic head and a switch contact unit for inputting data are mounted on the back side of said circuit board, and said switch contact unit is coupled to and activated by an operable input unit mounted on said back cover.

6. A camera according to claim 5, wherein a controller for controlling the circuit elements on said circuit board is mounted on one of the front side and back side of said circuit board.

7. A camera having a magnetic head in a camera body in which information is recorded by the magnetic head on a magnetic recording layer formed on the back surface of a photographic film, said camera comprising:

an exposure frame defining an exposure aperture for determining an exposure area on said photographic film;

a film guide plate for supporting the back of said photographic film, said film guide plate having a front surface which faces said exposure frame, said front surface being disposed at the back of said exposure frame and spaced by a predetermined distance from said exposure frame;

a circuit board mounted on a back surface of said film guide plate and having a front side which opposes said back surface, said circuit board being electrically connected to said magnetic head;

a first projection extending outward from the back surface of said film guide plate, a first slit formed in said first projection, and a light emitting diode mounted on the front side of said circuit board to face said first slit, said light emitting diode recording information on one lateral edge area of said photographic film;

a second projection extending outward from the back surface of said film guide plate, a second slit formed in said second projection, and a photosensor mounted on the front side of said circuit board to face said second slit, said photosensor detecting a perforation formed in said photographic film on said one lateral edge area;

a controller for controlling circuit elements on said circuit board mounted on the back surface of said circuit board;

said magnetic head being supported by said film guide plate and extending through an opening formed in said film guide plate so that a front surface of said magnetic head is substantially flush with the front surface of said film guide plate;

a back cover fixed to said camera body in opposition to a back side of said circuit board;

a liquid crystal panel mounted on the back side of said circuit board, and window formed in said back cover to allow observation of said liquid crystal panel externally from said camera body; and a magnetic head driver for driving said magnetic head and a switch contact unit for inputting data mounted on the back side of said circuit board, said switch contact unit being coupled to an input unit mounted on said back cover.

* * * * *